United States Patent
Le et al.

(10) Patent No.: US 9,821,761 B2
(45) Date of Patent: Nov. 21, 2017

(54) SYSTEM AND METHOD FOR WEBBING PAYOUT

(71) Applicant: Ford Global Technologies, LLC, Dearborn, MI (US)

(72) Inventors: Jialiang Le, Canton, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 14/947,581

(22) Filed: Nov. 20, 2015

(65) Prior Publication Data
US 2017/0144625 A1    May 25, 2017

(51) Int. Cl.
*B60R 22/00*    (2006.01)
*B60R 22/48*    (2006.01)

(52) U.S. Cl.
CPC ...... *B60R 22/48* (2013.01); *B60R 2022/4808* (2013.01)

(58) Field of Classification Search
CPC combination set(s) only.
See application file for complete search history.

(56) References Cited

U.S. PATENT DOCUMENTS

| | | | |
|---|---|---|---|
| 5,788,280 A * | 8/1998 | Ohsumi | B60R 22/023 280/805 |
| 5,877,707 A | 3/1999 | Kowalick | |
| 6,443,488 B1 | 9/2002 | Kippelt et al. | |
| 6,533,321 B2 | 3/2003 | Class et al. | |
| 7,350,809 B2 | 4/2008 | Matsuda | |
| 2002/0110261 A1* | 8/2002 | Yanai | B60R 21/0132 382/104 |
| 2005/0184489 A1* | 8/2005 | Kobayashi | B60R 21/231 280/729 |
| 2007/0035114 A1 | 2/2007 | Breed et al. | |
| 2007/0114768 A1 | 5/2007 | Lennir | |
| 2007/0195990 A1 | 8/2007 | Levy | |
| 2014/0158806 A1 | 6/2014 | Harda | |
| 2014/0168441 A1* | 6/2014 | Koike | G08B 21/22 348/148 |
| 2015/0091283 A1* | 4/2015 | Yamanaka | B60R 21/18 280/733 |
| 2015/0175068 A1* | 6/2015 | Szostak | B60K 35/00 340/435 |
| 2016/0129881 A1* | 5/2016 | Harda | B60R 21/013 701/45 |
| 2016/0159320 A1* | 6/2016 | Andreen | B60R 22/48 382/103 |

FOREIGN PATENT DOCUMENTS

| | | |
|---|---|---|
| DE | 10142792 | 4/2003 |
| EP | 2218606 | 9/2011 |
| GB | 2236419 | 4/1991 |
| WO | WO 9924291 | 5/1999 |

* cited by examiner

*Primary Examiner* — Hussein A. Elchanti
(74) *Attorney, Agent, or Firm* — Frank A. MacKenzie; Bejin Bieneman PLC

(57) ABSTRACT

An image is received from an image sensor including an occupant's head and a webbing. A center line of the occupant is determined. A webbing payout length is determined based on the center line. A safety device is adjusted based at least in part on the webbing payout length.

18 Claims, 6 Drawing Sheets

SYSTEM AND METHOD FOR WEBBING PAYOUT

BACKGROUND

Occupant detection and classification systems use various metrics to detect and classify vehicle occupants. The metrics can be measured or based on a user input. Sometimes, the metrics relate to the occupant's size. For instance, an occupant detection system may distinguish adult occupant size based on a seatbelt payout. Present occupant classification systems may determine seatbelt webbing payout length based on indirect measurements, e.g., spindle diameter, webbing thickness, webbing on spindle, film spool effect, etc. Present mechanisms for measuring seatbelt payout can be difficult, inefficient, and/or costly to implement.

DETAILED DESCRIPTION

Directly measuring a seatbelt webbing payout length can provide superior and/or less costly occupant classification, and can allow for adjustment of safety devices to accommodate the occupant. For example, a seatbelt webbing can be marked with infrared ink indicating the payout length measurements. An image sensor can read the infrared markings, substantially invisible to the occupant, to determine an absolute payout length and classify the occupant accordingly. The image sensor can capture an image of the occupant and the seatbelt webbing, determine an occupant center line based on the occupant's shoulders and/or head and eye location, determine a measurement region based on the seatbelt webbing and the occupant center line, and read the infrared markings within the measurement region to determine the payout length. The image sensor may be installed in the vehicle for other occupant state applications, e.g., occupant distraction, workload estimation, occupant physiological state estimation, and/or drowsiness detection.

Figure 1:
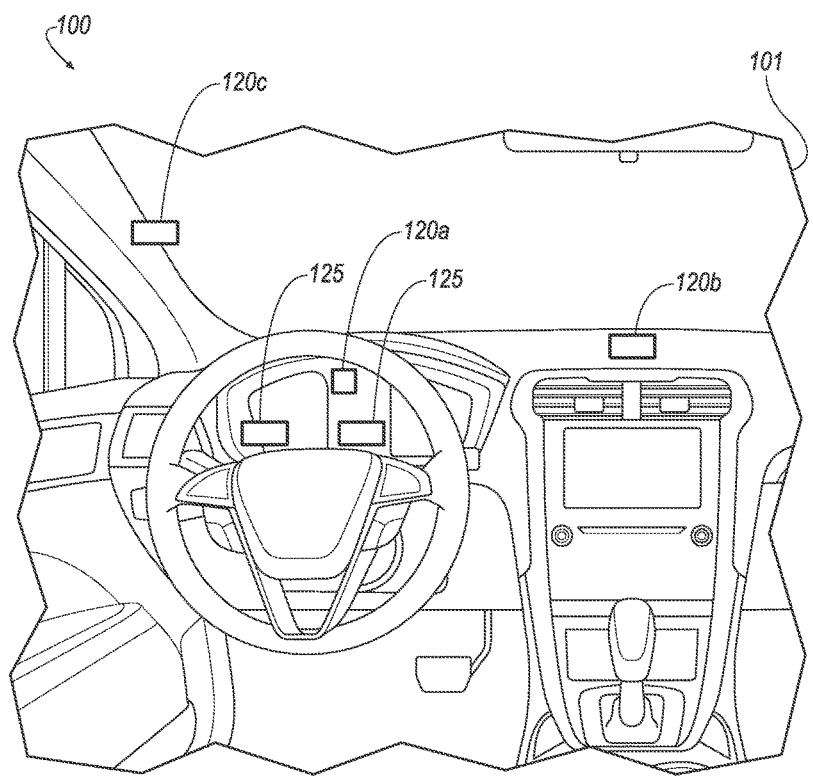
FIG. 1 is a perspective view of an exemplary system for determining a webbing payout length.

FIG. 1 illustrates an exemplary system 100 in a vehicle 101 for determining a webbing payout length. The vehicle 101 includes image sensors 120 and infrared light sources 125. The image sensor 120 may be disposed in front of the occupant in and/or on the instrument panel 120a, or in and/or on the center stack 120b, or in and/or on a vehicle pillar 120c, or any other suitable location in the vehicle 101 for capturing an image of the occupant. The image sensor 120 is provided to capture visible light and/or infrared light. The image sensor 120 may be a 3D camera, e.g., a time of flight camera, which can capture an image and measure the image distance from the camera. An image sensor 120 may alternatively or additionally be a stereo camera, a complementary metal-oxide semiconductor (CMOS) sensor augmented with infrared sensors for measuring the distance of the image from the camera, a charge-coupled device (CCD) sensor, etc. The image sensor 120 collects data, e.g., an image, of the occupant.

The infrared light sources 125 produce infrared light onto, e.g., a vehicle 101 occupant. The infrared light allows the image sensors 120 to detect objects and markings visible only in infrared light. The infrared light sources 125 may be disposed in and/or mounted on, e.g., a vehicle 101 dashboard.

Figure 2:
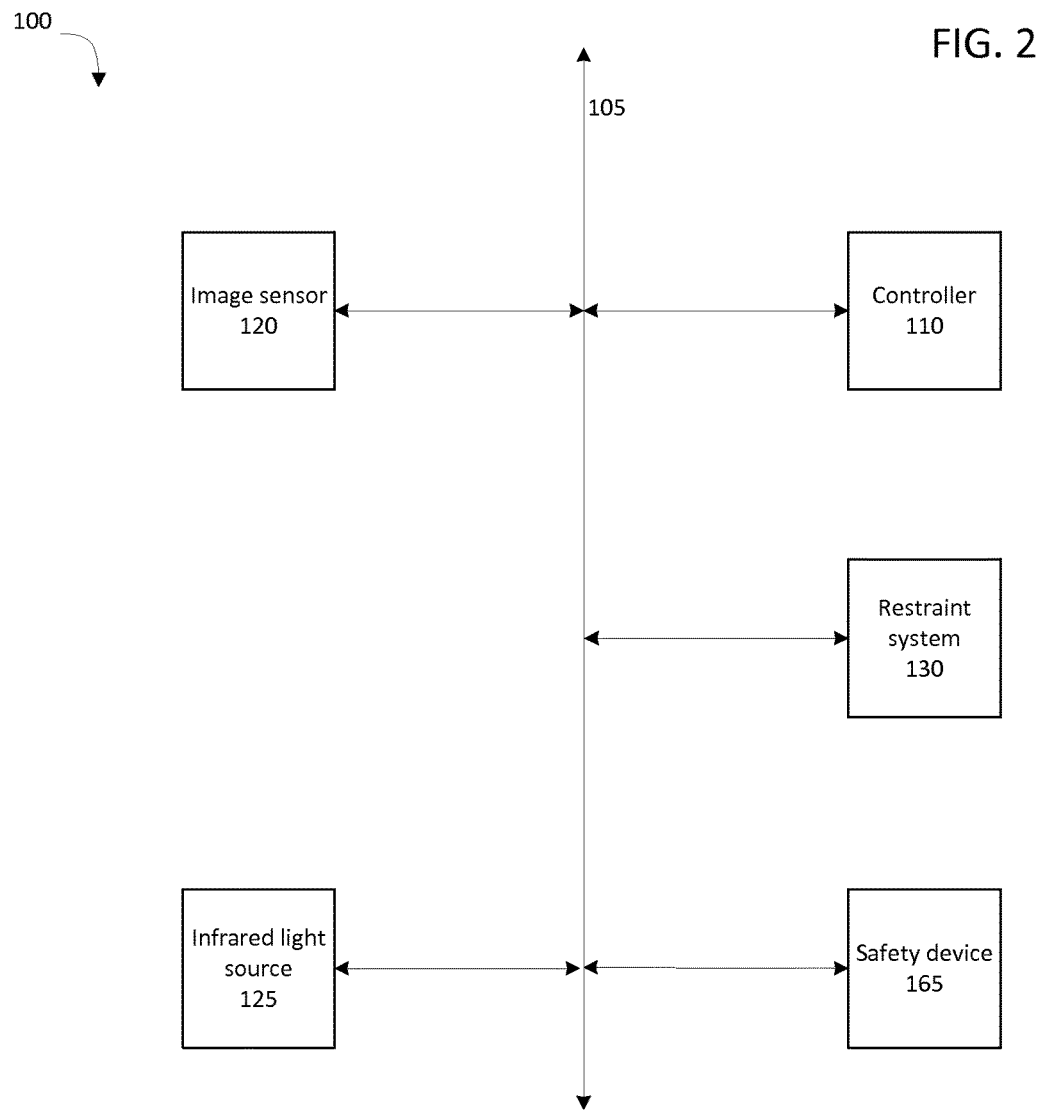
FIG. 2 is a block diagram of the system of FIG. 1.

FIG. 2 is a block diagram of the system 100. The system 100 includes a controller 110 communicatively coupled to the image sensors 120, the infrared light sources 125, and a restraint system 130 via a communications bus 105. The system 100 may further include a safety device 165 communicatively coupled to the controller 110 via the bus 105. In another example, the restraint system 130 and the safety device 165 may comprise a single device, as is known, adjusted by the controller 110. For example, the restraint system 130 and an airbag installed in a steering wheel may comprise a single safety device 165 that may be adjusted based on the seatbelt webbing payout length. As described below, the airbag may receive instructions from the controller 110 to adjust airbag deployment characteristics based on the webbing 135 payout, and the restraint device 130 may receive instructions to adjust, e.g., seatbelt position and/or payout rate.

The bus 105, e.g., one or more known mechanisms for network communications in the vehicle 101, e.g., a controller area network (CAN) bus or the like, such as is known, may be used to provide various communications, including data from the image sensors 120 to the controller 110.

The controller 110 may include an electronic computing device including a processor and a memory, the memory storing instructions such that the processor is programmed to determine a webbing payout length. For example, the controller 110 may be programmed to receive information from the image sensor 120 to adjust the restraint device 130 according to the webbing payout length. The controller 110 may be further programmed to determine a classification of a vehicle 101 occupant based on the webbing payout length and seat position. The seat position can be determined with seat position sensors that detect the fore and aft position of the seat and seat back angle sensors that detect the angle of the seat back, as are known. Furthermore, the controller 110 may be programmed to tune one or more vehicle subsystems in accordance with the classification. For example, the controller 110 may be programmed to generate and output command signals that command the vehicle subsystems to adjust one or more settings in accordance with the classification. An example of such a vehicle 101 subsystem may include, e.g., an electronic control unit (ECU) such as is known. The ECU may control the restraint system 130 and/or the safety device 165, and/or may be a component of the controller 110.

The memory of the controller 110 may be of any known type, e.g., hard disk drives, solid-state drives, servers, or any volatile or non-volatile media. The memory may store data sent over the bus 105.

The restraint device 130 may be, e.g., a seatbelt having a webbing 135. The restraint device 130 may receive instructions from the controller 110 to make an adjustment based on the webbing 135 payout, e.g., to a webbing 135 payout rate and/or webbing 135 position by adjusting a D-ring position, etc. The webbing 135 position may be, e.g., the height of the webbing 135 in a vertical direction measured from a vehicle 101 floor, surface of a vehicle 101 seat, etc., a location of the webbing 135 in a direction along a longitudinal axis of the vehicle, i.e., toward the front or rear of the vehicle 101, a location of the webbing 135 in a lateral direction that is substantially perpendicular to the longitudinal direction, and/or rotation of the webbing 135, e.g., the orientation of the D-ring through which the webbing 135 may be threaded, as is known, relative to the longitudinal, lateral, and/or vertical axes (also possibly referred to as X, Y, and Z axes, e.g., in a Cartesian coordinate system as is known). In one example, the controller 110 may send an instruction to the restraint device 130 to adjust the height of the webbing 135 based on the seatbelt payout length. The restraint system 130 may further be adjusted based on an occupant classification, e.g., with respect to age, gender, weight, etc.

The safety device 165 may be, e.g., an anti-submarining seat cushion and/or seat pan with adjustable stiffness, a steering column with adjustable collapsing stiffness, a knee bolster with adjustable stiffness for controlling occupant kinematics and for lower extremity protection during frontal collisions, and/or another bolster, another airbag, etc. The safety device 165 may include an airbag packaged in a steering wheel. The airbag may receive instructions from the controller 110 to adjust airbag deployment characteristics based on the webbing 135 payout and location. The airbag deployment characteristics may further be adjusted based on the occupant classification. The controller 110 may send instructions to adjust the safety device 165 based on the occupant classification, the occupant classification being based on the webbing 135 payout and the seat position. The restraint system 130 and the safety device 165 response characteristics may be tuned to the classification, i.e., empty, a small adult, an average adult, or an obese adult, using known occupant protection system tuning methods, e.g., computer simulations, component, sled, and vehicle tests.

Figure 3:
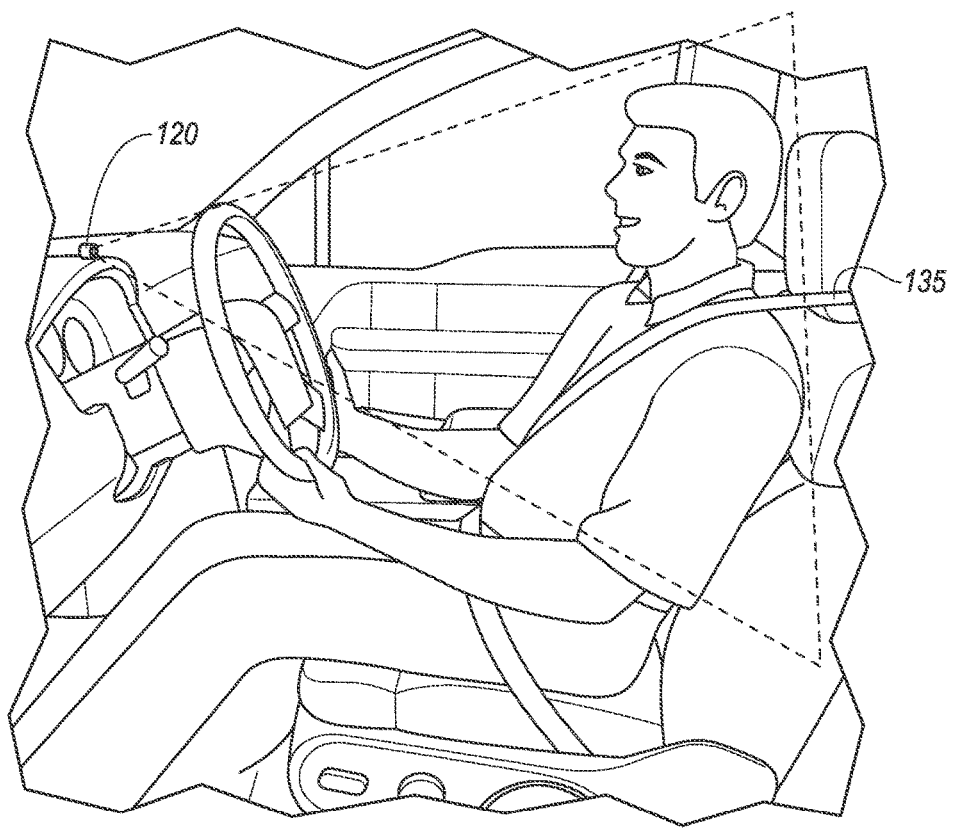
FIG. 3 is a view of the system of FIG. 1 capturing an example image of a vehicle occupant.

FIG. 3 illustrates an exemplary image of the vehicle 101 occupant captured by the image sensor 120. Here, the image sensor 120 is located in the dashboard, and captures an image of the vehicle 101 occupant. The image may include a vehicle 101 occupant's face, shoulders, and torso, including the webbing 135 of the restraint system 130. The controller 110 may determine a payout length of the webbing 135 based on the image captured by the image sensor 120. Based on the payout length of the webbing 135 and seat position, the controller 110 may classify the vehicle 101 occupant and adjust the restraint system 130 and/or the safety device 165. For example, the controller 110 may, e.g., in a known manner, adjust seatbelt height, i.e., the D-ring position, and/or webbing payout of the restraint system 130 based on the classification.

Figure 4:
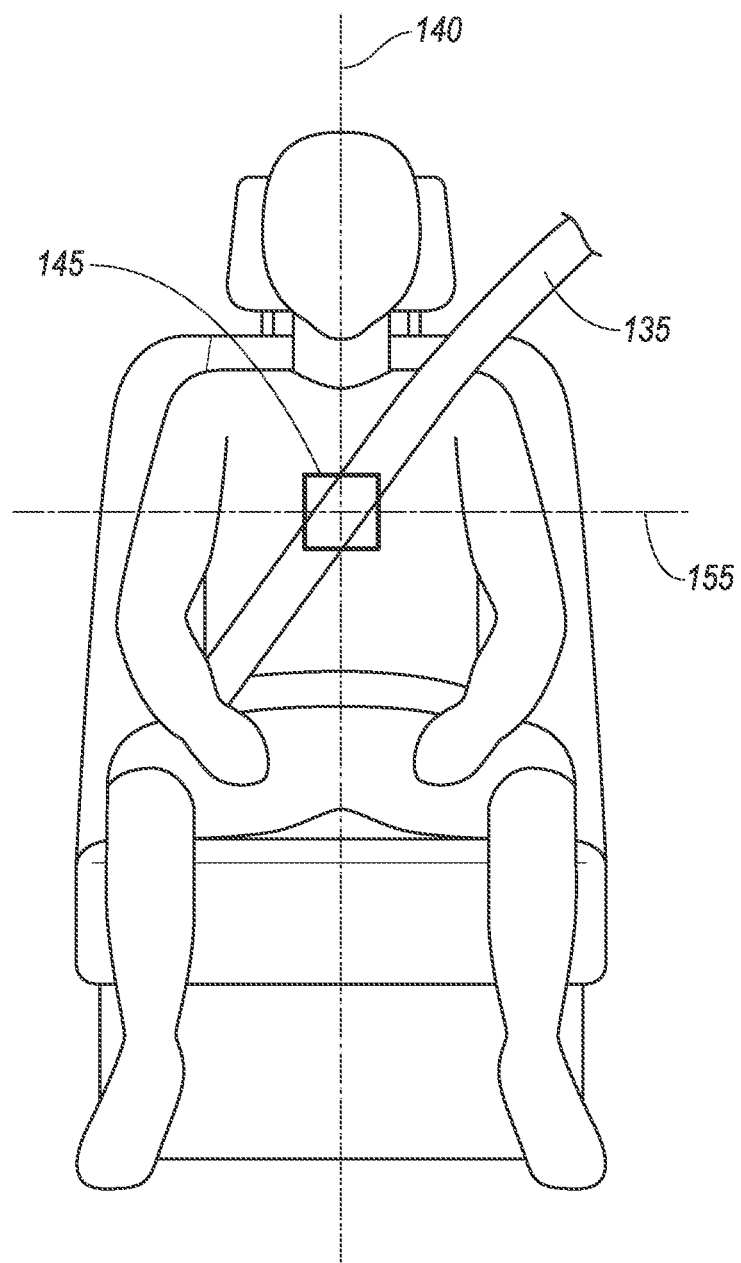
FIG. 4 is a view of the image of FIG. 3 indicating a measurement region.

FIG. 4 illustrates identification of a center line 140 of the occupant and a measurement region 145 on the webbing 135. The measurement region 145 provides a measurement of the payout length of the webbing 135. The measurement region 145 may be located at an intersection of the center line 140 and the webbing 135. The center line 140 of the occupant is a vertical line substantially through a midpoint between outer edges of the occupant's shoulders and/or the occupant's eyes, when the occupant is looking forward. The controller 110 can be programmed to identify the center line 140 using known image processing techniques.

Figure 5:
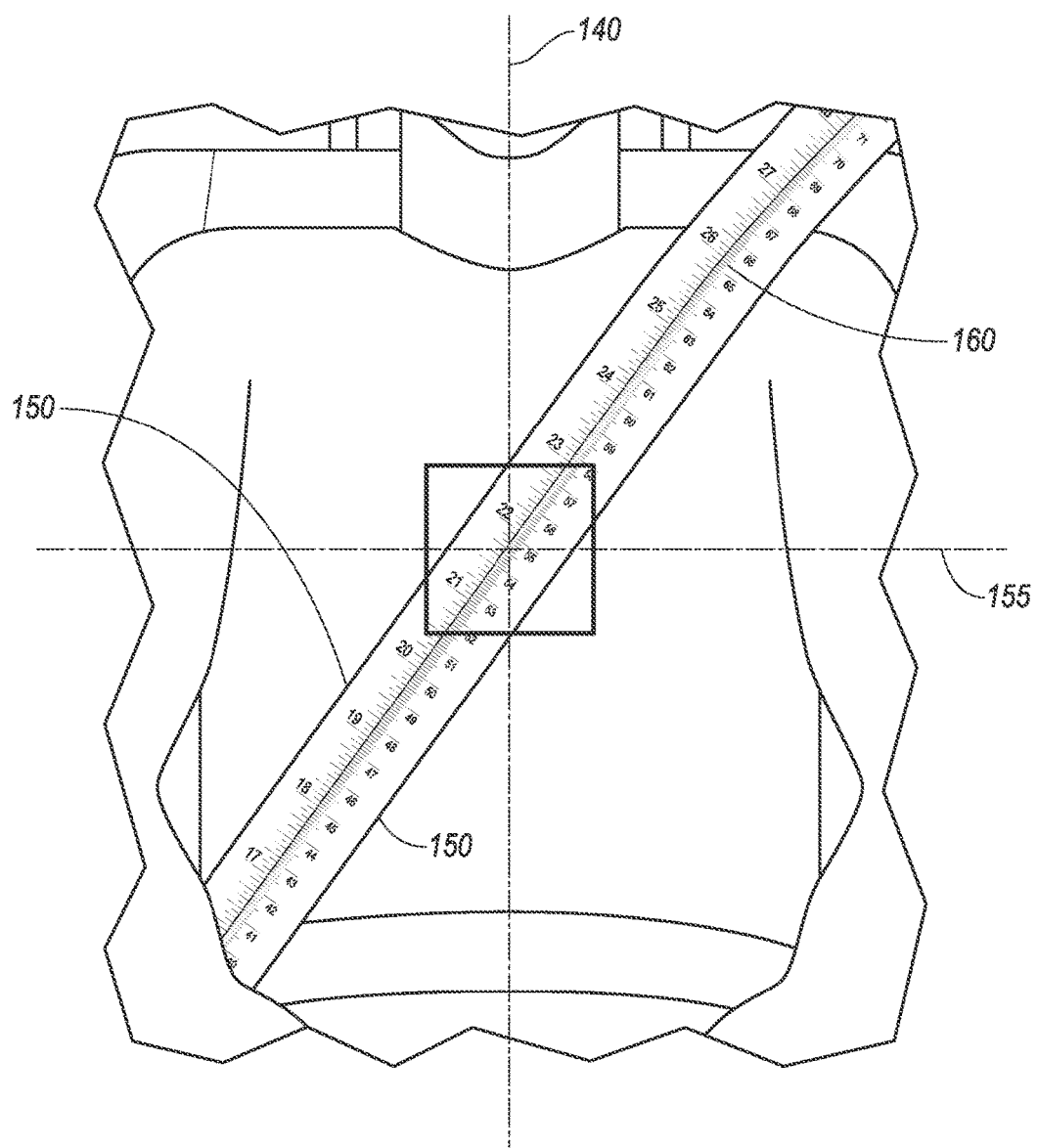
FIG. 5 is a view of the measurement region of FIG. 4 showing the webbing payout length.

FIG. 5 illustrates the measurement region 145. The webbing 135 has two edges 150, which the controller 110 can be programmed to identify from the image using known techniques. Based on the edges 150 and the center line 140, the controller 110 may determine a webbing center line 155 using known techniques. The webbing center line 155 is a horizontal line that intersects the center line 140 at the midpoint between the edges 150 of the webbing 135, typically determined by known image processing techniques. The measurement region 145 is defined around this intersection of the center line 140 and the webbing center line 155. The measurement region 145 may be, e.g., a square having two inch sides, the region 145 having a center at the intersection of the center line 140 and the webbing center line 155.

The webbing 135 may have markings 160 indicating a payout length of the webbing 135. The markings 160 may be numbers written in, e.g., ink visible only in infrared light. With the infrared light from the infrared light sources 125, the image sensor 120 may capture the markings 160 written in the ink in the image, while the vehicle 101 occupant would not see the markings 160. The controller 110 may determine the webbing 135 payout length by reading the marking 160 within the measurement region 145. The measurement region 145 may be chosen to allow only a single marking 160, indicating the payout length of the webbing 135. Alternatively, if there are multiple markings 160 within the measurement region 145, the controller 110 may take, e.g., an arithmetic mean of the markings 160, a maximum of the markings 160, a minimum of the markings 160, etc., to determine the payout length.

Figure 6:
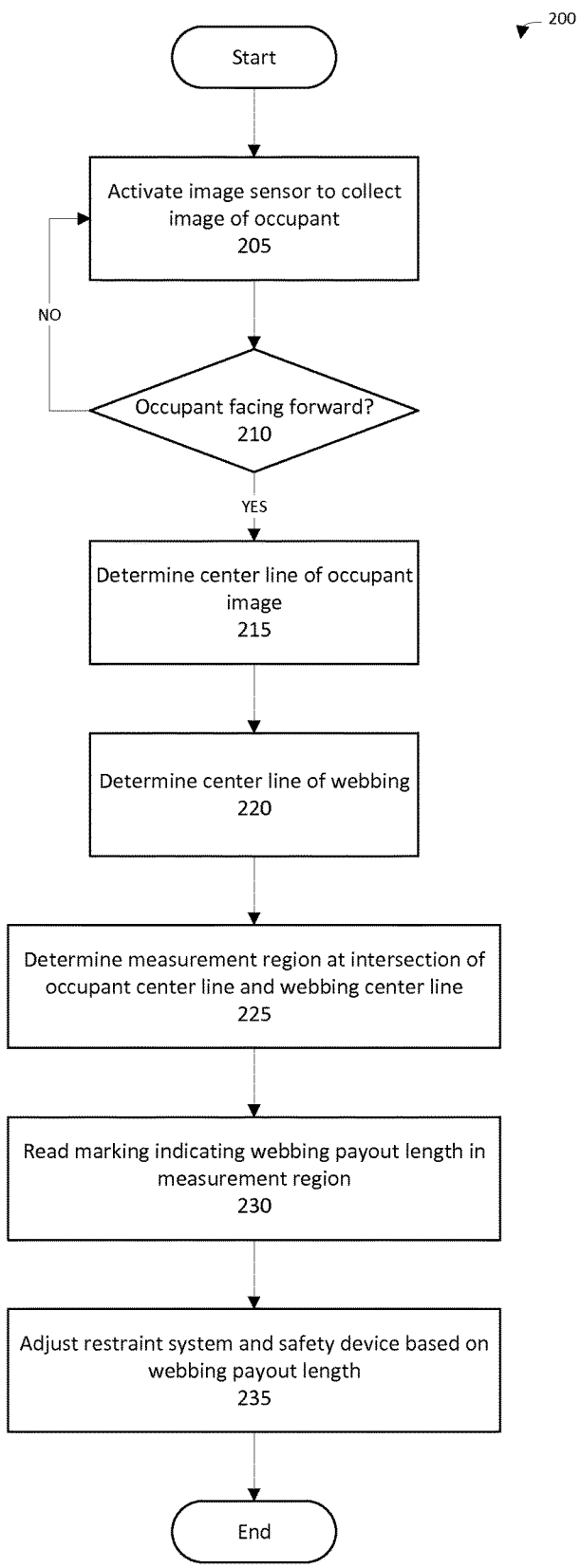
FIG. 6 is an exemplary process for determining seatbelt webbing payout length.

FIG. 6 illustrates an exemplary process 200 for adjusting the restraint system 130 and/or the safety device 165 based on the payout length of the webbing 135. The process 200 begins in a block 205 where the image sensor 120 captures an image of the vehicle 101 occupant. The image contains both visible images and images shown in infrared light from the infrared light sources 125.

Next, in a block 210, the controller 110 determines whether the vehicle 101 occupant is facing forward. The center line 140 may be determined based on the occupant's face, and the face must be facing forward. The controller 110 determines whether the occupant is facing forward using known image processing methods. If the occupant is facing forward, the process 200 continues in a block 215. Otherwise, the process 200 returns to the block 205 to capture another image.

In the block 215, the controller 110 determines the center line 140 based on the image of the occupant's face and shoulders. For example, the center line 140, as shown in FIG. 4, may be the line substantially halfway between the occupant's shoulders. The center line 140 is typically determined using known image processing techniques.

Next, in a block 220, the controller 110 determines the webbing center line 155. As described above, the webbing center line 155 is typically determined using known image processing methods based on the location of the edges 150 of the webbing 135.

Next, in a block 225, the controller 110 determines the measurement region 145 at the intersection of the center line 140 and the webbing center line 155. The measurement region 145 is predetermined and may be, e.g., a square having two inch sides.

Next, in a block 230, the controller 110 reads the markings 160 in the measurement region 145 to determine the payout length of the webbing 135. The markings 160, visible from the infrared light from the infrared light sources 125, are captured by the image sensor 120 and identified by the controller 110.

Next, in a block 235, the controller 110 adjusts the safety device 165 and/or the restraint device 130 based on the payout length of the webbing 135, and the process 200 ends. Based on the payout length and seat position, the occupant may be classified into a classification, e.g., empty, small adult, average adult, or obese adult. Based on the classification, the controller 110 may adjust the safety device 165 and/or the restraint device 130 to accommodate the size of the occupant.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer including a processor and a memory, the memory storing instructions executable by the computer to:
   receive an image including an occupant's head and a webbing from an image sensor;
   determine a center line of the occupant;
   determine a measurement region based on an intersection of the webbing and the center line of the occupant;
   determine a webbing payout length based on the measurement region; and
   adjust a safety device based at least in part on the webbing payout length.

2. The system of claim 1, wherein the webbing includes markings indicating the webbing payout length, the instructions further including instructions to determine the webbing payout length by reading the markings.

3. The system of claim 2, wherein the markings include infrared ink.

4. The system of claim 1, wherein the instructions further include instructions to determine the measurement region based on a pair of edges of the webbing and the center line.

5. The system of claim 1, wherein the webbing includes markings written in infrared ink indicating the webbing payout length, and the instructions further include instructions to determine the webbing payout length based on the marking in the measurement region.

6. The system of claim 1, wherein the instructions to adjust the safety device include instructions to adjust a webbing payout rate based on the webbing payout length.

7. The system of claim 1, wherein the center line is defined by a face of the occupant.

8. The system of claim 1, wherein the instructions further include instructions to classify the occupant into a classification based on the webbing payout length and to adjust the safety device based on the classification.

9. The system of claim 8, wherein the classification includes at least one of empty, small adult, average adult, and obese adult.

10. A method, comprising:
    receiving an image including an occupant's head and a webbing from an image sensor;
    determining a center line of the occupant;
    determining a measurement region based on an intersection of the webbing and the center line of the occupant;
    determining a webbing payout length based on the measurement region; and
    adjusting a safety device based at least in part on the webbing payout length.

11. The method of claim 10, wherein the webbing includes markings indicating the webbing payout length, the method further comprising determining the webbing payout length by reading the markings.

12. The method of claim 11, wherein the markings are written in infrared ink.

13. The method of claim 10, further comprising determining the measurement region based on a pair of edges of the webbing and the center line.

14. The method of claim 10, wherein the webbing includes markings written in infrared ink indicating the webbing payout length, and further comprising determining the webbing payout length based on the marking in the measurement region.

15. The method of claim 10, further comprising adjusting a webbing payout rate based on the webbing payout length.

16. The method of claim 10, wherein the center line is defined by a face of the occupant.

17. The method of claim 10, further comprising classifying the occupant into a classification based on the webbing payout length and adjusting the safety device based on the classification.

18. The method of claim 17, wherein the classification includes at least one of empty, small adult, average adult, and obese adult.

\* \* \* \* \*